United States Patent
Meibach

[11] Patent Number: 6,156,364
[45] Date of Patent: Dec. 5, 2000

[54] MOLDED PIZZA CRUST

[75] Inventor: Ronald Louis Meibach, Deerfield, Ill.

[73] Assignee: Kraft Foods, Inc., Northfield, Ill.

[21] Appl. No.: 09/521,347

[22] Filed: Mar. 9, 2000

[51] Int. Cl.⁷ .............................. A21C 11/00; A21D 8/00
[52] U.S. Cl. .............................. 426/496; 99/353; 99/373; 99/432; 425/585; 425/588; 426/504; 426/512
[58] Field of Search ..................... 426/496, 498, 426/504, 512, 519; 99/353, 373, 432; 425/572, 585, 588; 366/3, 12, 51, 101

[56] References Cited

U.S. PATENT DOCUMENTS

| | | | |
|---|---|---|---|
| 4,303,008 | 12/1981 | Hice et al. | 99/353 |
| 5,016,528 | 5/1991 | Chen | 99/353 |
| 5,074,778 | 12/1991 | Betts, Jr. et al. | 99/432 |
| 5,154,115 | 10/1992 | Kian | 99/432 |
| 5,417,149 | 5/1995 | Raio et al. | 99/353 |
| 5,775,208 | 7/1998 | Kimple | 99/432 |
| 5,786,013 | 7/1998 | Kloppenburg et al. | 99/353 |
| 5,919,508 | 7/1999 | Donnelly et al. | 426/496 |

*Primary Examiner*—George C. Yeung
*Attorney, Agent, or Firm*—Fitch, Even, Tabin & Flannery

[57] ABSTRACT

The present invention provides a method of forming proofed dough for baked goods in a predetermined shape, as well as an apparatus for practicing the method. The apparatus includes a closed dough handling system that includes a pressurized dough mixer, a dough transporting device joined to the pressurized dough mixer, and an injection molding device joined to the dough transporting device. The method includes the step of transporting proofed dough from the pressurized dough mixer through the dough transporting device to the injection molding device, wherein the injection molding device fills the injection mold with dough when it is connected to the dough transporting device, thus forming one or more pieces of dough having the predetermined shape within the molds. The injection molds containing the dough may then either be conveyed into an oven to form a baked piece of dough having the predetermined shape, or conveyed into a freezer to form a frozen piece of dough having the predetermined shape.

22 Claims, 1 Drawing Sheet

MOLDED PIZZA CRUST

FIELD OF THE INVENTION

The invention relates to a method of preparing pizza crust from pizza dough using a continuous flow system using injection molding to shape the dough into the crust.

BACKGROUND OF THE INVENTION

One of the major driving forces in the modern production of food items is increased efficiency, and often reduced number of unit operations, in the processes involved. These factors have entered into the production of pizza crusts, and other foods, in a number of ways.

U.S. Pat. No. 4,303,008 discloses an apparatus for producing a restructured food product from small particles of food. In particular embodiments the food particles, and the food product, are obtained from shrimp. The small particles of food are comminuted to form a paste having a fluent consistency. The paste is injected into the cavity of a mold under high pressure. While under pressure, the paste is rapidly heated until it is thoroughly and uniformly cooked. Platens lining the molds are provided with heating elements, so that the food introduced is cooked in place. The cooked product is removed from the mold cavity for packaging and sale.

U.S. Pat. No. 5,016,528 discloses a baking apparatus that includes cover and pan molds having recesses adapted to be engaged to define a baking chamber. The apparatus cuts dough into pieces to be shaped into dough balls, which are fed into the mold for shaping. There is further a device for feeding the dough into the recesses of the molds and a device for shaping the dough into the desired shape. The cover and pan molds containing the shaped dough are fed as a unit into an oven for baking. Once the baking is complete, the baked confections are removed from the mold pieces.

U.S. Pat. No. 5,154,115 discloses a pizza crust cooking utensil for use with pizza batter to partially precook a pizza crust for home or commercial use. The utensil includes two cooking plates aligned to form a hollow cooking chamber in which the crust is formed as the batter is cooked. The utensil is adaptable for use in a cooking appliance or a variety of ovens.

U.S. Pat. No. 5,417,149 discloses a device for forming and par baking a pizza crust, comprising a frame having a base portion to which is attached a lower support platen, and an upper housing portion to which is attached an upper mold. Pizza dough introduced into a pan is placed on the support platen, and a handle lowers the upper mold to compress the dough between the bottom surface of the upper mold and the pizza pan.

U.S. Pat. Nos. 5,775,208 (Jul. 7, 1998) and 6,010,731 (Jan. 4, 2000) provide a pizza pan system and a method utilizing a pizza pan and a lip to cover the pizza pan in order to compress, shape, conform, and trim the dough about a rim area of the pizza pan and lid.

U.S. Pat. No. 5,786,013 discloses a baking oven for baking material held in two-piece baking molds, and includes a closing station and a removal station. The closing station includes controlled activating members for closing a two-piece baking mold. The removal station includes controlled activating members for allowing the two-piece baking mold to be unlocked and opened. The invention provides a method of manufacturing products in a series of baking molds to be passed through an oven. In a baking cycle, the mold is opened, filled, closed and locked, guided through an oven, and opened and finally emptied at a removal station. The opened molds are filled at a filling station, where an amount of dough is placed in the mold.

The methods known in the art generally employ measured amounts or pieces of dough (or other food products) introduced into a mold or apparatus. The forming of dough pieces, or the cutting of dough and forming of dough balls, generally requires complicated and costly mechanical devices for implementation in a commercial setting. Furthermore, generally the dough pieces or dough balls must be coated with oil to prevent sticking during the working of the pieces or balls, and while feeding them into the molds. The oil involved in this preventive measure adds to the overall cost of manufacture as well as the total calorie content of the resulting food product. Additionally, pressing the dough pieces or balls between the pieces of the mold yields excess dough or trim that normally is recycled in separate operation steps. In some cases, the excess dough or trim is treated as a waste which must be disposed of properly.

There remains a need in the baking industry, and in the pizza baking industry in particular, for a method of making, and apparatus for preparing, dough pieces having a predetermined shape which eliminates the need to process individual pieces of dough or dough balls prior to forming the dough into the desired shape. There further remains a need for a process, and an apparatus, with a minimal number of unit operations. There remains additionally a need for a method of making dough pieces of predetermined shape that eliminates (or substantially reduces) the need to coat the dough with additional oil, and that eliminates (or substantially reduces) excess dough and trim. The present invention addresses these needs.

SUMMARY OF THE INVENTION

The present invention provides a method of forming proofed dough for baked or frozen goods into a predetermined shape and an apparatus for practicing the method. The method includes the steps of:

(1) providing a closed dough handling system comprising (a) a pressurized dough mixer, (b) an injection molding apparatus having one or more molds wherein each mold has one or more cavities of the predetermined shape and wherein each mold is removable from the injection molding apparatus, (c) a dough transporting means having an input end and an output end, wherein the input end is attached to the pressurized dough mixer and the output end is attached to the injection molding apparatus, whereby dough from the pressurized dough mixer can be transported by the dough transporting means to the injection molding apparatus and then into the cavities, and (d) an ejecting means for removing the dough-containing molds from the injection molding apparatus;

(2) preparing proofed dough from dough-forming ingredients in the pressurized dough mixer;

(3) transporting the proofed dough from the pressurized dough mixer through the dough transporting means to the injection molding apparatus and into the cavities, whereby the transported dough fills the cavities and forms the predetermined shape in each cavity; and (4) ejecting the dough-containing molds from the injection molding apparatus. Preferably the apparatus and method also include a conveying apparatus adjacent to the injection molding apparatus for receiving the ejected dough-containing molds. Preferably, the ejected, dough-containing molds are ejected or deposited on the conveying apparatus and then conveyed directly to the appropriate unit operation (i.e., baking, freezing, packaging, and like units). Preferably, the mold remains around the predetermined shaped dough until the shape is fixed or set (i.e., until the shaped dough can retain its predetermined shape without external support).

In an important embodiment of the method, the proofed dough includes carbon dioxide introduced by blending carbonated water, or gaseous carbon dioxide, or by adding yeast, or by a combination thereof, into a mixture of the dough-forming ingredients contained within the pressurized dough mixer (batch, semi-continuous, or continuous type mixer). In an additional embodiment of the method, the dough transporting means allows the dough to be injected or impelled from the pressurized dough mixer into the cavity or cavities of the molds. If desired, the dough can be expanded or proofed between the pressurized dough mixer and the injector. In a still additional significant embodiment of the method, the dough is a pizza dough and the predetermined shape is in the form or shape of a pizza crust. In a still additional significant embodiment of the method, little or no oil is required to coat the interior cavity surfaces. Generally, the internal cavity surfaces are stainless steel, Teflon-coated stainless steel, electro-polished stainless steel, and the like.

An apparatus for forming proofed dough into a predetermined shape is also provided using a closed dough handling system. This system includes (1) a pressurized dough mixer; (2) a dough transporting means having an input end attached to the pressurized dough mixer and an output end; (3) an injection molding apparatus joined to the output end of the dough transporting means, wherein the injection molding apparatus has one or more molds with each mold containing at least one cavity forming the predetermined shape for receiving the dough; and (4) an injection means for ejecting the one or more molds from the injection molding apparatus after at least one cavity is filled with dough. Preferably, the system also includes a conveying means for moving the ejected molds to the next unit operation (i.e., oven, freezer, or the like) for further treatment of the predetermined shaped dough. Preferably, the molds remain with, and contain the predetermined shaped dough until the dough is able to maintain its shape without the supporting mold (e.g., until partially or fully baked or frozen).

DETAILED DESCRIPTION OF THE INVENTION

Figure 1:
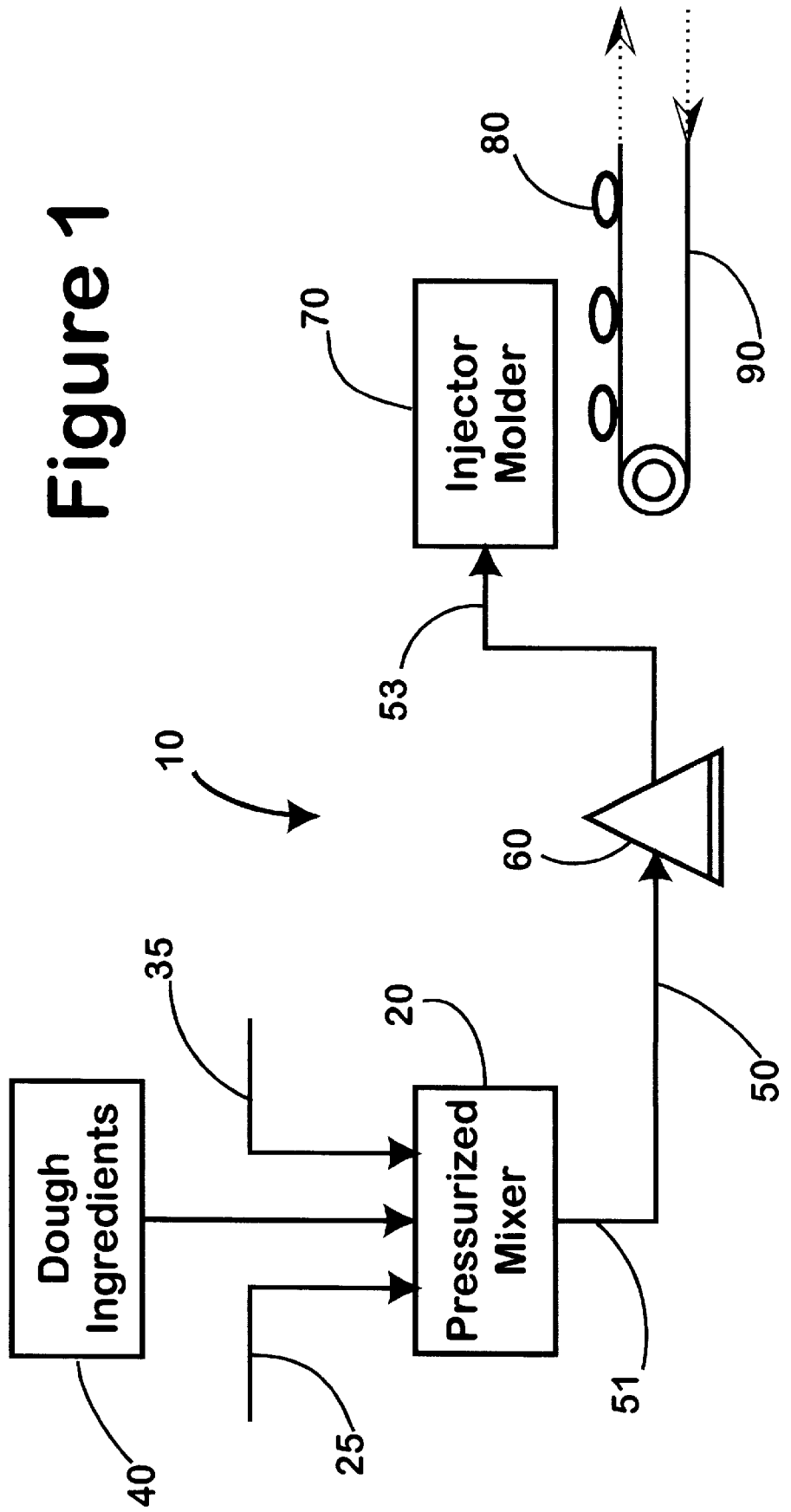
FIG. 1 provides a schematic diagram of an apparatus suitable for forming proofed dough for baked goods into a predetermined shape.

The present invention provides an efficient method for forming proofed dough for baked goods into a predetermined shape, as well as a generalized apparatus for practicing the method. The present method and apparatus are especially adapted for the manufacture of pizza crusts. The method minimizes the number of unit operations required to provide the dough having a predetermined shape, thereby enhancing the efficiency of the method. The present method is an essentially continuous method which can be, and preferably is, automated. Furthermore, by minimizing the number of unit operations, the scale and complexity of the equipment employed in the apparatus is likewise significantly reduced. This method essentially eliminates the generation of trim and flashing since the exact desired shape is produced. Proofing time can also be significantly reduced using this method with carbonated water or $CO_2$ proofing. The efficiency of the method, and the simplification of the apparatus, contribute to significant cost reductions in providing the final product, a dough piece having a desired and predetermined shape. Moreover, this method allows an exact shape to be produced without using double pressing. One especially preferred predetermined shape is that of a pizza pie or crust. By adjusting or modifying the cavity, such pizza pies or crusts may have, as desired, a circular, oval, square, rectangular or like shape and may have, as desired, a generally flat configuration or have a raised crust portion on the outer edge of the pie or crust. Such raised crust portions may be of the various heights depending on whether the pizza pie is to a conventional pizza or a deep-dish pizza. If desired, the molds may impart a decorative shape or motif to the raised crust portion. Likewise, baked goods of other shapes, sizes, and designs may be made by the present method simply by modifying the shape of the cavity or cavities in the injection mold apparatus.

A schematic diagram providing a generalized rendering of the system or apparatus 10 employed in the method of the invention is shown in FIG. 1. The system apparatus 10 employs a closed dough handling system which can operate under positive pressures (generally about 50 to about 500 psig) that may be accumulate or be developed within the system. The system or apparatus 10 comprises a pressurized dough mixer 20, a dough transporting means 50 having an input end 51 and an output end 53, wherein the input end 51 is joined to the pressurized dough mixer, and an injection molding means 70 joined to the output end 53 of the dough transporting means 50. The apparatus 10 (including pressurized mixer 20, dough transporting means 50, and injection molding apparatus 70) should be able to withstand relatively high operating pressures (generally about 50 to about 500 psig). Such pressures may arise from the introduction of pressurized $CO_2$ gas 35 (or other gas) into mixer 20 or the development of pressure from endogenously produced $CO_2$ within the mixer 20 or generated from the pump 60. Pressurized $CO_2$ gas 35 (or other suitable gas) may also be used to move or propel the dough produced in mixer 20 to the injection molder 70 through the dough transporting means 50. Preferably, however, the dough is moved or propelled through the dough transporting means 50 by means of a pump or impeller 60. The mixer is fitted with one or more ports for introducing the dough ingredients 40. Preferably the mixer is fitted with a separate water line 25 so that water (and/or carbonated water) can be added as needed. The dough may be leavened either by natural fermentation of a yeast included among the dough ingredients 40, in which case $CO_2$ forms spontaneously as the yeast induces the dough to ferment and rise. Alternatively, the dough being mixed in the mixer may be leavened by means of carbonated water (which can be introduced via water line 25 or a separate line (not shown)) or by gaseous $CO_2$ introduced via line 35. After the dough is formed, the pressure is released to proof the dough.

The dough transporting means 50 is preferably a tube, pipe, hose, or comparable structure which is joined in leakproof fashion at its input end 51 to the pressurized mixer 20 and at its output end 53 to the injector molder 70. The dough transporting means 50 can be either flexible or rigid. Preferably, however, it is flexible at least at ends 51 and 53 so that the apparatus can be readily disassembled for cleaning or repair as needed. The dough transporting means 50 preferably has a circular cross section; in any case its should be enough to accommodate the flow of a viscous fluid such as the mixed dough or batter resulting from leavening the dough ingredients in the mixer. Because of the high viscosity of the dough or batter, the dough transporting means 50 is preferably kept as short as possible. The dough transporting means can also one or more pumps or impellers 60 for moving the dough from the pressurized dough mixer 50 into the one or more molds contained within the injection molding means 70. The dough impelling means typically is an industrial high viscosity pump or impeller (e.g., screw auger, progressive cavity, rotary vane, and the like) and develops sufficient pressure to drive the dough or batter from the pressurized mixer to the injection molding means. Generally the pressure developed at the injector molder is about 100 to about 1000 psig.

The injection molding means 70 contains one or more injection molds (not shown). Each mold has one or more cavities with the desired predetermined shape or shapes. The injection molding means 70 further includes releasable leakproof connecting means, preferably of the quick-release type, that releasably connect the output end 53 of the dough transporting means 50 to the one or more injection molds.

In operation, dough ingredients, with the proper amounts of water and carbon dioxide, are mixed in pressurized mixer 20 to form dough. Generally the viscosity of the dough is about 5 to about 10 million centipoises at ambient temperature. The dough is pumped or otherwise moved through dough transporting means 50 to the injector molder 70. In the injector molder, the dough is pumped under pressure into the cavities in the molds. Sufficient pressure (generally about 100 to about 1000 psig) is applied to the dough entering the injector molder 70 such that the cavities are essentially filled with dough. The injector molder 70 may have one or more molds and each mold may have one or more cavities. The molds and cavities therein may be filled with dough one at a time (i.e., serially) or simultaneously. The dough transporting means may have more than one outlet end 53 (not shown) so as to fill several molds and/or cavities at the same time. Likewise, more than one pressurized mixer 20 and dough transporting means 50 can be connected to a single injection molder 70. Such multiple feeds to the injector molder would allow operation while one pressurized mixer (and/or its related components), for example, was cleaned or repaired. Such multiple feeds could also, for example, be used to injected different dough mixes into a single mold or cavity. Such multiple feeds could also, for example, be used to inject melted cheese or other ingredients directly into the dough. The distribution of such ingredients in the dough could be controlled by varying the relative amounts, viscosities, and pressures of the various feeds into the molds. Alternatively, the multiple feeds could be used to inject carbon dioxide or other gas into the dough to form cavities or channels within the dough; such a process is similar to gas-assisted injection molding. Such cavities or channels could be filled, if desired, by later injection of melted cheese or other ingredients.

The injector molder 70 may be operated at or near ambient temperatures or at elevated temperatures. Operation at elevated temperatures (i.e., greater than about 300° F., preferably about 400 to about 500° F.) would allow the initial cooking or baking of the dough to begin within the injector molder.

The preferably leakproof connections to the injector molder 70 operate to inject dough or batter into the cavity of the particular injection mold connected at a given instant in time under the pressure developed by the dough impelling means 60. Each mold may have one or more cavities therein.

Once the cavity of the injection mold is filled with dough or batter, the leakproof connection to the dough transporting means can be released (preferably without losing pressure in the system). The filled mold or molds may then be ejected. The molds may be ejected one by one as they are filled or may be ejected as a group once all are filled. Once the molds are ejected, new molds may be placed in the injection molding apparatus 70 and the process continued.

The apparatus of the invention preferably contains a conveying means shown partially at 90 adjacent the injection molding means 70. The conveying means may be an endless recirculating belt or roller track or comparable mechanical device. Ejected molds 80 are preferably placed on the conveyer 90 directly from the injector molder 70. Ejected molds 80, containing one or more dough-filled cavities, can be moved via conveyer 90 to the next desired unit operation. The next unit operation may be, for example, an oven for partially or fully baking the dough, a cooling unit for cooling or freezing the dough. If desired, the injection molds themselves can be heated and/or cooled for in-mold baking and freezing of molded pizza crusts. Once the dough is able to retain its predetermined shape without the support of the mold, the dough can be removed and the molds readied for reuse in the injector molder. In certain embodiments of the invention, the conveying means conveys the injection molds into an oven or a freezer to form baked or frozen pieces of dough having the predetermined shape. Once formed, the shaped dough can be partially or fully baked or frozen using conventional techniques and equipment. Once baked or frozen, the shaped dough, either alone or with added ingredients (i.e., pizza sauce or the like) can be packaged using conventional packaging techniques.

Ingredients used to prepare the dough are widely known in the baking arts. Such ingredients include flour or a mixture of various varieties of flour; milk and/or water; and oil, such as vegetable oil, or melted shortening, or a fat. The dough may optionally further contain salt, sugar, stabilizers, spices, and/or additional ingredients that enhance flavor or color. Yeast leavening can also be included with the dough ingredients. Once the ingredients are added, the dough mixer is sealed so that it withstands pressure that may build up within it during the mixing and proofing of the dough. If leavening includes gaseous $CO_2$ and/or carbonated water, these are also added at this time. The dough is mixed under pressure. After the mixer is vented, the dough is allowed to rise or swell, and is proofed, to provide the proofed dough to be introduced into the injection molds.

The proofed dough is transported from the pressurized dough mixer 20 through the dough transporting means 50 to the injection molding means 70. The dough mixer, dough transporting means and injection molding means constitute a single closed system built to withstand pressure. Pressure develops within the system, at points before the point at which the dough impelling means 60 acts on the dough, either by the introduction of $CO_2$ into the dough by means of gaseous $CO_2$ or carbonated water, or by the development of $CO_2$ by the fermentation, or by all these means. Additional pressure is developed by the pump or impeller 60; this additional pressure is used to inject the dough into the mold cavities. Only at relief points beyond the filling of the injection mold is the pressure relieved and brought back to atmospheric pressure. The closed system serves to maintain the pressures developed within the mixer, the transporting means, and the injection molding means. The closed system further serves to minimize the need to carry out various operations on the dough, and maintains a continuous process stream that does not generate discrete portions of dough that need to be shaped or manipulated by hand or by machinery. Only upon introduction of the dough into each injection mold is the dough formed, by an automated, simplified process, into discrete portions having a predetermined shape.

The injection molding means 70 comprises one or more injection molds having a cavity with the predetermined shape movably deployable with respect to the dough transporting means. The injection molding means further comprises releasable leakproof connecting means, or coupling means, that releasably connect the pipe or tube of the dough transporting means to the injection mold. Thus the dough, impelled through the mold injection means by the pressure imposed by the dough impelling means, fills an injection mold when the injection mold is connected to the dough transporting means by means of the releasable leakproof connection. In this way, dough fills the injection mold and forms pieces of dough having the predetermined shape of the mold. Once a given injection mold is filled, it is released from the leakproof connecting means and deployed away therefrom. A different, empty, injection mold is then deployed in place of the filled mold, and releasably connected to the dough transporting means. The filled injection molds are deployed in series to a conveying means 90 adjacent the injection molding means, and deposited thereon.

The system or apparatus 10 may also employ a computer control system. Such a control system could, for example, meter the ingredients into the mixer 20 and then control the mixer itself, adjusting, for example, the water and $CO_2$ introduction as required. Such a control system could also control the injection of the dough into the injection molder 70 and the ejection of the molds after completion of the molding cycle. The amount of dough injected could be controlled, taking into account, for example, variations in dough viscosity and temperature, to insure that each cavity is properly filled.

The injection molds filled with dough may then be conveyed, by the conveying means, into an oven to form a baked piece of dough having the predetermined shape. When the injection mold cavity has the shape of a pizza crust, the baked dough emerges in the form of a pizza crust. Alternatively, the injection molds containing the piece of dough may be conveyed using the conveying means into a freezer to form a frozen piece of dough having the predetermined shape provided by the injection molds. Once frozen, the preshaped dough can be removed from the molds. The frozen dough can be used to prepare frozen pizzas for the retail or consumer market. Alternatively, these molds with their enclosed pieces of preshaped dough may be stored frozen until such time as appropriate for baking.

Once baked, the piece of dough releases readily from the injection mold. For this reason, little or no oil is needed to line or coat the injection mold prior to the injection of the dough or batter. Likewise, since no manual or mechanical shaping of discrete pieces of dough takes place in this method, no oil is needed to coat a piece of dough or dough ball during a shaping operation. For these reasons, the need for additional oil in a method of forming a piece of dough into a predetermined shape is obviated using the steps and apparatus of the present invention.

In preferred embodiments of the invention, the dough formulation is a pizza dough formulation, and the predetermined shape of the cavity in the injection molds is the shape of a pizza crust.

That which is claimed is:

1. A method of forming proofed dough for baked goods having a predetermined shape, said method comprising the steps of:
   (1) providing a closed dough handling system comprising (a) a pressurized dough mixer, (b) an injection molding apparatus having one or more molds wherein each mold has one or more cavities forming the predetermined shape and wherein each mold is removable from the injection molding apparatus, (c) a dough transporting means having an input end and an output end, wherein the input end is attached to the pressurized dough mixer and the output end is attached to the injection molding apparatus, whereby dough from the pressurized dough mixer can be transported by the dough transporting means to the injection molding apparatus and then into the cavities, and (d) an ejecting means for removing the dough-containing molds from the injection molding apparatus;
   (2) preparing proofed dough from dough-forming ingredients in the pressurized dough mixer;
   (3) transporting the proofed dough from the pressurized dough mixer through the dough transporting means to the injection molding apparatus and into the cavities, whereby the transported dough fills the cavities and forms the predetermined shape in each cavity; and
   (4) ejecting the dough-containing molds from the injection molding apparatus.

2. The method as defined in claim 1, wherein the dough is a pizza dough and the predetermined shape formed by cavities is a pizza crust.

3. The method as defined in claim 1, wherein the proofed dough contains carbon dioxide derived from carbonated water, gaseous carbon dioxide, carbon dioxide-producing yeast, or mixtures thereof which is added to the dough-forming ingredients contained within the pressurized dough mixer; and wherein the pressurized dough mixture is vented to allow proofing.

4. The method as defined in claim 2, wherein the proofed dough contains carbon dioxide derived from carbonated water, gaseous carbon dioxide, carbon dioxide-producing yeast, or mixtures thereof which is added to the dough-forming ingredients contained within the pressurized dough mixer.

5. The method as defined in claim 1, wherein the dough transporting means is an impeller or pump which impels the dough from the pressurized dough mixer into the cavities of the molds.

6. The method as defined in claim 4, wherein the dough transporting means is an impeller or pump which impels the dough from the pressurized dough mixer into the cavities of the molds.

7. The method as defined in claim 1, wherein no oil is introduced between the injection mold and the injected dough.

8. The method as defined in claim 6, wherein no oil is introduced between the injection mold and the injected dough.

9. The method as defined in claim 1, further comprising the step of conveying the ejected dough-containing molds to an oven to partially or fully bake the predetermined-shaped dough.

10. The method as defined in claim 8, further comprising the step of conveying the ejected dough-containing molds to an oven to partially or fully bake the predetermined-shaped dough.

11. The method defined in claim 1, further comprising the step of conveying the ejected dough-containing molds to a freezer to freeze the predetermined-shaped dough.

12. The method defined in claim 10, further comprising the step of conveying the ejected dough-containing molds to a freezer to freeze the predetermined-shaped dough.

13. The method defined in claim 1, further comprising directly heating the ejected dough-containing molds to partially or fully bake the predetermined-shaped dough.

14. The method defined in claim 1, further comprising directly cooling, the ejected dough-containing molds to freeze the predetermined-shaped dough.

15. An apparatus for forming proofed dough for baked goods into a predetermined shape, said apparatus comprising a closed dough handling system which comprises (a) a pressurized dough mixer, (b) an injection molding apparatus having one or more molds wherein each mold has one or more cavities forming the predetermined shape and wherein each mold is removable from the injection molding apparatus, (c) a dough transporting means having an input end and an output end, wherein the input end is attached to the pressurized dough mixer and the output end is attached to the injection molding apparatus, whereby dough from the pressurized dough mixer can be transported by the dough transporting means to the injection molding apparatus and then injected into the cavities, and (d) an ejecting means for removing the dough-containing molds from the injection molding apparatus.

16. The apparatus as defined in claim 15, further comprising a pump or impeller for injection the dough under pressure into the cavities.

17. The apparatus as defined in claim 16, further comprising a conveying means for conveying the ejected dough-containing molds to an oven or freezer.

18. The apparatus as defined in claim 17, further comprising a computer control system for controlling the injection of dough into the cavities and the ejection of the dough-containing molds.

19. The apparatus as defined in claim 18, wherein the computer control system further controls the pressurized dough mixer.

20. The apparatus as defined in claim 15, wherein the predetermined shape is a pizza crust.

21. The apparatus as defined in claim 18, wherein the predetermined shape is a pizza crust.

22. The apparatus as defined in claim 19, wherein the predetermined shape is a pizza crust.

* * * * *